United States Patent
Molisch et al.

(10) Patent No.: US 7,164,720 B2
(45) Date of Patent: Jan. 16, 2007

(54) METHOD AND SYSTEM FOR ACQUIRING ULTRA-WIDE-BANDWIDTH COMMUNICATIONS SIGNALS USING AVERAGE BLOCK SEARCHES

(75) Inventors: Andreas Molisch, Arlington, MA (US); Sinan Gezici, Princeton, NJ (US); Hisashi Kobayashi, Princeton, NJ (US); H. Vincent Poor, Princeton, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 712 days.

(21) Appl. No.: 10/426,576

(22) Filed: Apr. 30, 2003

(65) Prior Publication Data

US 2004/0176119 A1 Sep. 9, 2004

Related U.S. Application Data

(60) Provisional application No. 60/451,442, filed on Mar. 3, 2003.

(51) Int. Cl.
*H04L 27/00* (2006.01)

(52) U.S. Cl. ........................ 375/256; 375/239
(58) Field of Classification Search ............... 375/144, 375/145, 148, 149, 237, 238, 239, 242, 256
See application file for complete search history.

(56) References Cited

U.S. PATENT DOCUMENTS 5,729,571 A * 3/1998 Park et al. ............... 375/149

FOREIGN PATENT DOCUMENTS

GB 2320403 A 6/1998
WO WO 96/41432 12/1996

OTHER PUBLICATIONS

E. Fischler and H. V. Poor, On the Tradeoff Between Two Types of Processing Gain, *40th Annual Allerton Conference on Communication, Control, and Computing*, 2002.
Polydoros et al. "A Unified Approach to Serial Search Spread-Spectrum Code Acquisition—Part I: General Theory," IEEE Transactions on Communications, vol. COM-32., No. 5, pp. 542-549, 1984.

* cited by examiner

*Primary Examiner*—Kevin Kim
(74) *Attorney, Agent, or Firm*—Dirk Brickman; Clifton D. Mueller; Gene V. Vinovur

(57) ABSTRACT

A method and system acquire a received impulse radio signal by correlating a region, including a plurality of cells, of the received impulse radio signal using multiple time-shifted template signals, each template signal having a different delay to obtain a correlation value for each template signal. The correlation values are averages, and a particular delay associated with a particular template signal having a substantial increase in successive averages to locate a signal cell in the region.

4 Claims, 2 Drawing Sheets

100

METHOD AND SYSTEM FOR ACQUIRING ULTRA-WIDE-BANDWIDTH COMMUNICATIONS SIGNALS USING AVERAGE BLOCK SEARCHES

CROSS REFERENCE TO RELATED APPLICATION

A claim of priority is made to U.S. provisional application Ser. No. 60/451,442, "Method and Apparatus for Rapid Signal Acquisition in Ultra Wideband Communications Systems," filed Mar. 3, 2003.

FIELD OF THE INVENTION

The invention relates generally to impulse radio signals, and more particularly to acquiring ultra-wide-bandwidth signals.

BACKGROUND OF THE INVENTION

Before a received ultra-wide-bandwidth (UWB) signal can be demodulated, a template signal must be aligned with the received signal. The purpose of the alignment is to determine a relative delay of the received signal with respect to the template signal. This process is called signal acquisition.

Conventionally, the alignment is performed by a serial search of possible delay times of cells in an uncertainty region, see Simon et al., "*Spread Spectrum Communications Handbook,*" McGraw-Hill, N.Y., 1994. Each different search location, i.e., time interval, with respect to time, is called a cell. If the signal exists at a delay location, then that cell is called a signal cell. In that method, the received signal is correlated with the template signal, and an output of the correlation is compared to a threshold. If the output is lower than the threshold, then the template signal is shifted by some amount time. The shifted amount time corresponds usually to a resolvable path interval. This information is then used to repeat the correlation until the output exceeds the threshold.

If the output of the correlation comes from a case where the signal path and the template signal are aligned, it is called a signal cell output, otherwise, it is called a non-signal cell output. A false alarm occurs when a non-signal cell output exceeds the threshold. In that case, time $t_p$ elapses until the search recovers. This time is called the penalty time for false alarm.

Due to the short time resolution of UWB signals, serially searching all delay locations can take a long time. Therefore, the alignment method must be fast so that the time allocated for the acquisition of the UWB signal is reduced.

The mean acquisition time of a serial search is directly proportional to the number of cells in the uncertainty region, N, for large N values, see Polydoros et al., "*A unified approach to serial search spread-spectrum code acquisition-Part I: General Theory,*" IEEE Trans. Comm., Vol. COM-32, pp. 542–549, May 1984. In a general form, FIG. 3 shows the basic operation of the prior art serial cell search of an uncertainty region 300 with a template 301.

Therefore, there is a need for a method and system that can acquire UWB signals in a shorter time than the known prior art serial search techniques.

SUMMARY OF THE INVENTION

In impulse radio communication systems, such as ultra-wide-bandwidth (UWB) communications, the received radio signal must be acquired before the signal can be demodulated. Due to the very short time resolution of the narrow pulses of the UWB signal, a considerable number of possible signal locations, i.e., delays, must be searched in order to acquire the received signal. For this reason, fast signal acquisition is very important for impulse radio communications.

Using a first template signal, a sequential block search method (SBS) according to the invention first determines a small region, with respect to time, where the received signal cells are likely to exist. Then, this region is searched in more detail to find the exact delay of the signal using a second template signal.

The correlation of the received signal with the first template signal effectively adds some cell outputs. The result is then used as a criterion to determine if that region, generally, contains signal cells.

If the correlated output for the region exceeds a specified threshold value, then the block is searched serially in detail using the second template signal.

The correlation intervals for the sequential block search and the serial cell search steps do not have to be the same. In fact, the correlation interval of the block search is usually chosen to be substantially longer in order to be able find the correct block with a high probability.

In harsh non-line-of-sight (NLOS) conditions, there are many multipaths, which make signal acquisition more challenging. If the first path, or first few paths, need to be acquired in such conditions, then an average block search method according to the invention can be used. In this method, a number of serial search outputs are averaged, and the amount of increase between successive average values is compared to a threshold to detect an edge of the start of the received signal.

If there is a significant increase in the average value, then the outputs of the cells causing that increase are further searched to determine the first path of the received signal.

DETAILED DESCRIPTION OF THE PREFERRED EMBODIMENT

Signal Model

Figure 1:
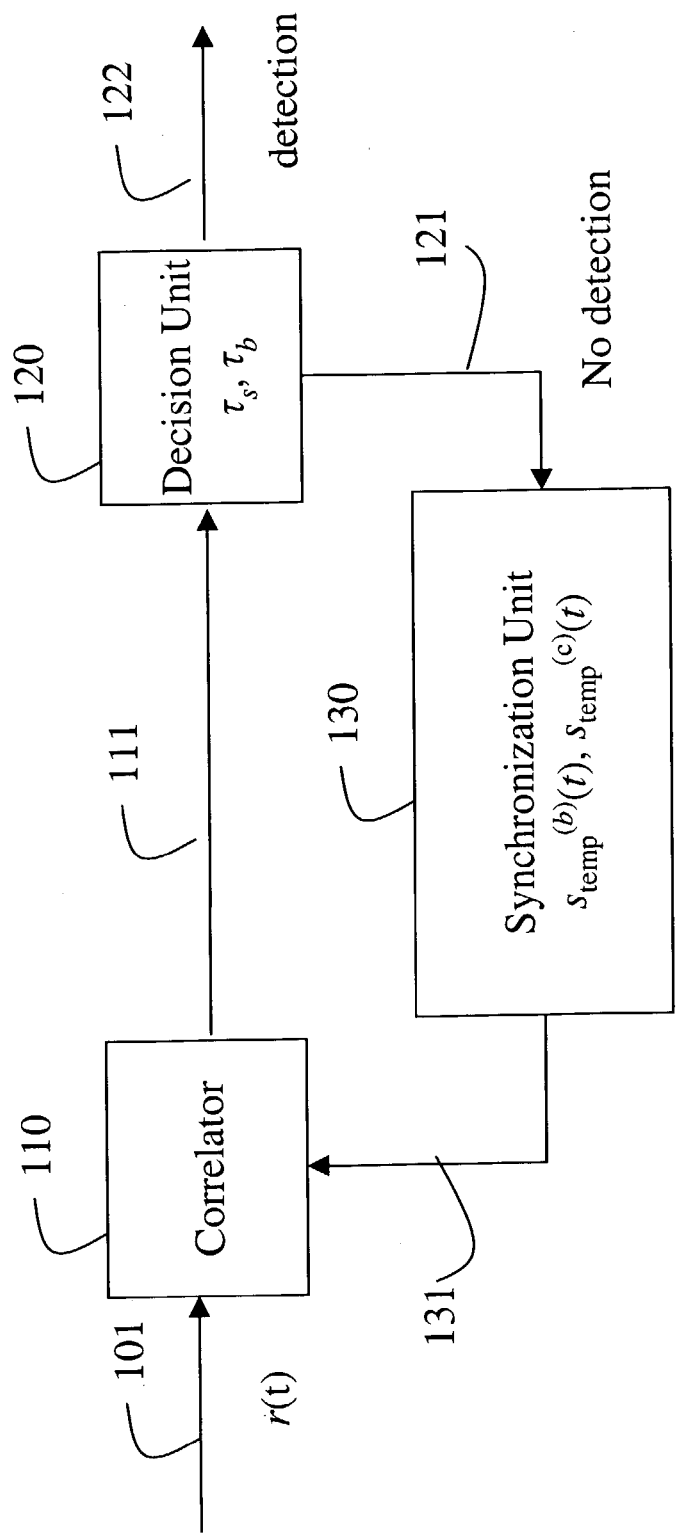
FIG. 1 is a block diagram of a sequential block search method and system according to the invention.

In a binary phase-shift keyed random time hopping impulse radio (TH-IR) system, the transmitted signal can be represented by the following model:

$$S_{tr}(t) = \sum_{j=-\infty}^{\infty} d_j^k b_{\lfloor j/N_f \rfloor}^k w_{tr}(t - jT_f - c_j^k T_c), \quad (1)$$

where $w_{tr}$ is the transmitted unit-energy pulse, $T_f$ is the average pulse repetition time, $N_f$ is the number of pulses representing one information symbol, and b is the information symbol transmitted, i.e., zero or one.

In order to allow the channel to be exploited by many users and avoid catastrophic collisions, a pseudo-random sequence $\{C_j\}$ is assigned to each user. This sequence is called the time hopping (TH) sequence. The TH sequence provides an additional time shift of $c_j T_c$ seconds to the $j^{-th}$ pulse of the signal, where $T_c$ is sometimes called the chip interval. To prevent pulses from overlapping, the chip interval is selected to satisfy $T_c \leq T_f/N_c$.

We consider coded IR systems where the $d_i$'s are binary random variables, and where $d_i$ and $d_j$ are independent for $i \neq j$, taking each values $\pm 1$ with a probability of $\frac{1}{2}$, see Fishler et al., "*On the tradeoff between two types of processing gain,*" 40$^{th}$ Annual Allerton Conference on Communication, Control, and Computing, 2002. This systems can be regarded as an random—code division multiple access radio signal (RCDMA) system with $T_f = T_c$. In this case, $N_f$ represents the processing gain.

We define a sequence $\{s_j\}$ as follows $$s_j = \begin{cases} d_{\lfloor j/N_c \rfloor} & j - N_f \lfloor j N_c \rfloor = c_{\lfloor j/N_c \rfloor} \\ 0 & \text{otherwise} \end{cases} \quad (2)$$

Then, assuming $T_f/T_c = N_c$, without loss of generality, Equation (1) can be expressed $$S_{tr}(t) = \sum_{j=-\infty}^{\infty} s_j b^k_{\lfloor j/N_f N_c \rfloor} w_{tr}(t - jT_c). \quad (3)$$

We assume that no data modulation is done during the acquisition stage, that is $b_{j/N_f N_c} = 1 \forall j$. In this case, the received signal over a flat fading channel in a single user system can be expressed as $$r(t) = \sum_{j=-\infty}^{\infty} s_j w_{rec}(t - jT_c - \tau) + \sigma_n n(t), \quad (4)$$

where $w_{rec}(t)$ is the received UWB pulse, and n(t) is white Gaussian noise with unit power spectral density. This model approximately represents the line-of-sight (LOS) case, with a strong first component.

The number of cells in an uncertainty region is taken to be $N = N_f N_c$. One of these cells is the signal cell, while the others are non-signal cells.

Template Signal

Assuming no data modulation for the purposes of acquisition, then the template signal that is used in a serial search for the signal model in Equation (3) can be expressed as follows:

$$s^{(c)}_{m_2}(t) = \sum_{n=jN_c}^{(j+m_2)N_c - 1} s_n w_{rec}(t - nT_c), \quad (5)$$

where $m_2$ is the number of pulses, over which the correlation is taken.

Sequential Block Search

For a sequential block search (SBS) according to the invention, there are two different template signals. The first template signal is used for searching a block of cells, while the second template signal is similar to the one used in the serial search.

The first template signal for the signal model described in Equation (3) can be expressed as follows:

$$s^{(c)}_{m_1}(t) = \sum_{i=0}^{K-1} \sum_{n=jN_c}^{(j+m_1)N_c - 1} s_n w_{rec}(t - nT_c - iT_c - (b-1)KT_c), \quad (6)$$

where B is the total number of blocks in the uncertainty region, each block including K cells, and where $m_1$ is the number of pulses, over which the correlation is taken. For simplicity, it is assumed that the total number of uncertainty cells can be expressed as $N = KB$. The value $T_c$ is taken as the minimum resolvable path interval.

The output of the correlation of the received signal and the first template signal in Equation (6) is used as a quick test to check if the whole block contains a signal cell, or not. The correlation output of the received signal and the second template signal is then used in a detailed search of a block.

The index of the block that is currently being searched is b, with b=1 initially. Then, the ABS method can be described as follows:

1) Check the $b^{th}$ block using the first template signal $s^{(b)}_{m_1}(t)$.
2) If the output of the $b^{th}$ block is not higher than a block threshold, $\tau_b$, then, go to step 6.
3) If the output of the $b^{th}$ block is higher than the block threshold, $\tau_b$, then search the block in more detail, i.e., cell-by-cell serial search with a signal threshold $\tau_s$, using the second template signal $s^{(c)}_{m_2}(t)$.
4) If no signal cell is detected in the block, go to step 6.
5) If the signal cell is detected in the block, DONE.
6) Set b=(b mod B)+1 and go to step 1.

When a false alarm (FA) occurs in the serial search part, the search resumes with the next cell after C time units, which is the penalty time in terms of frame time.

In step 5, "the signal cell is detected" means that the signal cell output exceeds the signal threshold, $\tau_s$. Similarly, in step 4, "no signal cell is detected" implies that the signal cell is not in the block, or the output of the cell is lower than the signal threshold $\tau_s$, even if the cell is in the block.

FIG. 1 shows the SBS method. The received signal 101 is correlated 110 with the first template signal of Equation (6), and the output 111 is compared 120 to the block threshold $\tau_b$.

If the block threshold is not exceeded 121, the decision unit has a synchronization unit 130 adjusted 131 the delay of the first template signal, and another correlation 110 with the received signal is performed.

When the block output 111 is higher than the block threshold $\tau_b$, the second template signal in Equation (5) is employed and the cells in the block are serially searched. In other words, decision unit 120 compares the outputs with the thresholds and decides if the signal is detected 122, or not 121, while the synchronization unit 130 adjusts 131 the delays of the template signals and sends the corresponding one to the correlation unit.

Average Block Search

An average block search method is appropriate in harsh NLOS conditions. The basic idea behind this method is to use an average value of a number of serial correlation outputs in order to see a considerable increase in the output values. This increase indicates the start of the signal cells.

The received signal in this case is expressed as:

$$r(t) = \sum_{j=\infty}^{\infty} \sum_{l=1}^{L} \alpha_l s_j w_{rec}(t - jT_c - \tau_l) + \sigma_n n(t), \quad (7)$$

where $\alpha_l$ is the amplitude coefficient and $\tau_l$ is the delay of the $l^{th}$ multipath component.

Consider the outputs of the correlations of the received signal with the following template signal:

$$s_m^{(c)}(t) = \sum_{n=jN_c}^{(j+m)N_c-1} s_n w_{rec}(t - nT_c). \quad (8)$$

If the absolute values of the results of these correlations are $Z_1, \ldots, Z_N$, then we can define $$w_i = \frac{1}{K} \sum_{j=iK+1}^{(i+1)K} z_j, \quad (9)$$

assuming N=KB.

Let i be the index of the averaged block currently being searched, with i=0 initially. Then, the SBS method can be described follows:

1) Check difference between successive averages $W_{i \bmod B} - W_{(i-1) \bmod B}$.
2) If the difference is not higher than a first threshold $\tau_\alpha$ go to step 6.
3) If the difference is higher than $\tau_\alpha$, check $Z_{(i \bmod B)K+1}, \ldots, Z_{(i \bmod B)+1)K}$ serially, comparing to a second threshold, $\tau_c$.
4) If no signal cells detected, go to step 6.
5) If signal cell(s) are detected, DONE.
6) Set i=(i+1) mod B, and go to step 1.

Figure 2:
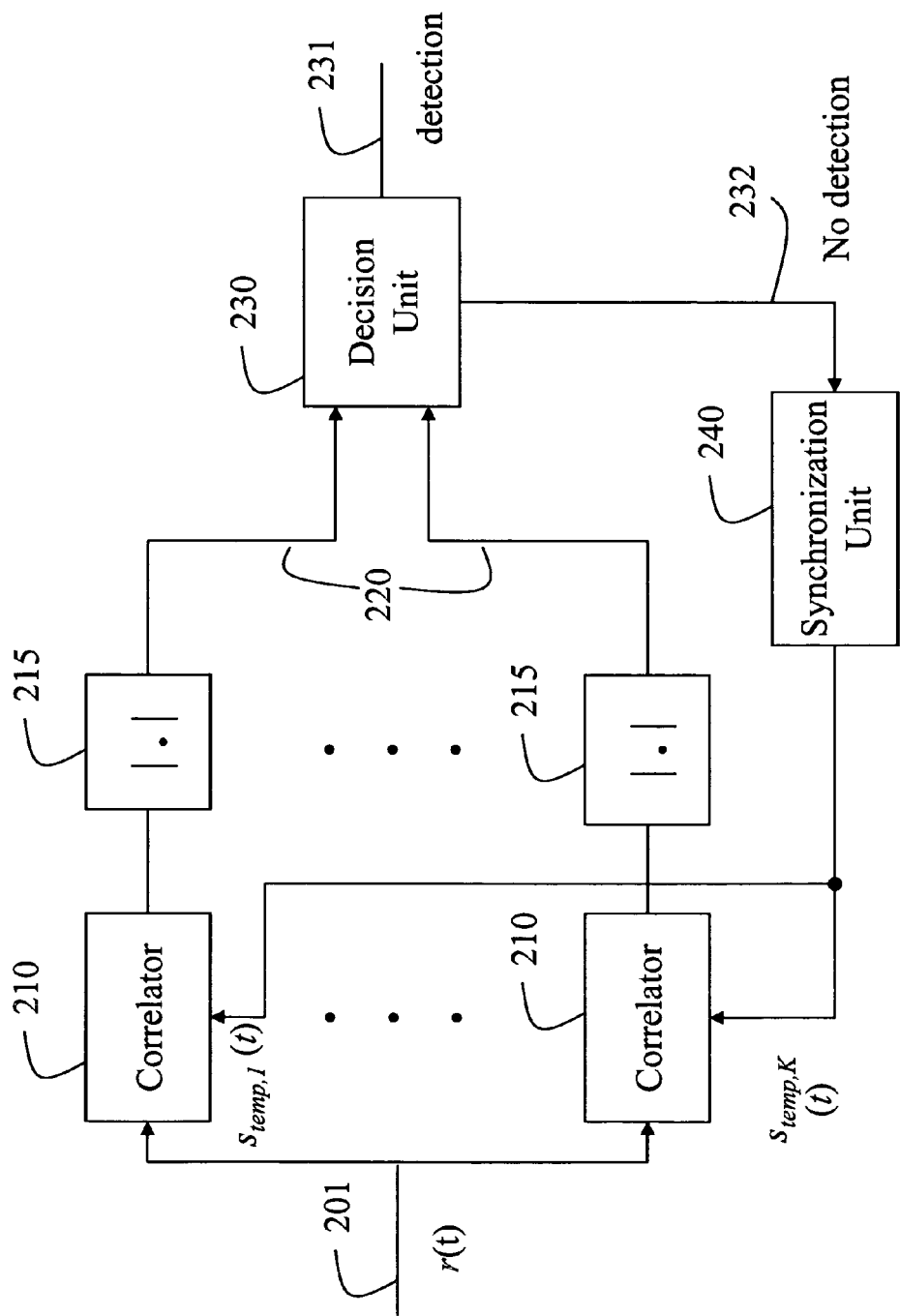
FIG. 2 is a block diagram of an average block search method and system according to the invention.

FIG. 2 shows ABS method and system 200. In this embodiment multiple correlators 210 averaging units 215 are used in parallel. A received signal r(t) 201 is first correlated 210 with a first template signals with different delays. Then, the absolute values of these correlations are averaged 220 and compared to the previous averaged value by the decision unit 230. If there is a significant increase in the average value and if any one of the serial search outputs in the corresponding block exceeds the threshold, the signal is detected 231.

If no detection 232 occurs, then, the delays of the template signal are adjusted by the synchronization unit 240, and the same steps are followed again.

Note that even though the block diagram is shown for the case with K correlators and averaging units, the method and system can also be worked with only one correlator. In such a situation, the decision unit can perform the averaging and comparison tasks by storing a predetermined number of outputs of the single correlator.

EFFECT OF THE INVENTION

The sequential block search method according to the invention provides a quick method to find the location(s) of a signal cell of a UWB signal. First, the method quickly determines a smaller region where signal cells are likely to exist. Then, it searches that region in detail to find the exact location of the signal. In this way, the time to acquire the UWB signal can be reduced considerably. In fact, the mean acquisition time of the SBS method becomes proportional to the square root of N for large signal-to-noise ratios. In contrast, the mean acquisition time of a prior art serial search is directly proportional to the number of cells in an uncertainty region. For practical values, the acquisition time using the SBS method is about the half of the serial search mean acquisition time.

In harsh multipath conditions, an average block search reduces the acquisition time because the averaged values of serial search outputs are more reliable in detecting the start of the signal in some NLOS situations. In this way, instantaneous increases in the single outputs are smoothed so that the frequency of false alarms is reduced. It should be noted that the invention can also be used in direct sequence—code division multiple access (DS-CDMA) systems.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for acquiring a received impulse radio signal, comprising:

correlating a region, including a plurality of cells, of the received impulse radio signal using a plurality of template signals, each template signal having a different delay to obtain a correlation value for each template signal, wherein the received impulse radio signal is expressed by $$r(t) = \sum_{j=\infty}^{\infty} \sum_{l=1}^{L} \alpha_l s_j w_{rec}(t - jT_c - \tau_l) + \sigma_n n(t),$$

where $\alpha_1$ is an amplitude coefficient, $s_j$ is a corresponding transmitted impulse radio signal, $\tau_1$ is a delay of an $l^{th}$ multipath component, $W_{rec}$ is a received pulse, and $\sigma_n(t)$ is white Gaussian noise with unit power spectral density, $T_f$ is an average pulse repetition time, $T_c$ is a minimum resolvable path interval, $N_f$ is the number of pulses representing one information symbol;

averaging the correlation values;

determining a difference between successive averages of the correlation values; and selecting a particular delay associated with a particular template signal having a substantial increase in the difference of the successive averages to locate a signal cell in the region.

2. The method of claim 1 wherein the template signal is $$s_m^{(c)}(t) = \sum_{n=jN_c}^{(j+m)N_c-1} s_n w_{rec}(t - nT_c),$$

where m is the number of pulses over a correlation interval associated with the region.

3. The method of claim 1 wherein the correlating of the region with the plurality of template signals is performed in parallel.

4. A system for acquiring a received impulse radio signal, comprising:

means for correlating a region, including a plurality of cells, of the received impulse radio signal using a plurality of template signals, each template signal having a different delay to obtain a correlation value for each template signal, wherein the received impulse radio signal is expressed by $$r(t) = \sum_{j=\infty}^{\infty} \sum_{l=1}^{L} \alpha_l s_j w_{rec}(t - jT_c - \tau_l) + \sigma_n(t),$$

where $\alpha_l$ is an amplitude coefficient, $s_i$ is a corresponding transmitted impulse radio signal, $\tau_l$ is a delay of an $l^{th}$ multipath component, $w_{rec}$ is a received pulse, and $\sigma_n(t)$ is white Gaussian noise with unit power spectral density, $T_f$ is an average pulse repetition time, $T_c$ is a minimum resolvable path interval, $N_f$ is the number of pulses representing one information symbol;

means for averaging the correlation values; and means for selecting a particular delay associated with a particular template signal having a substantial increase in successive averages to locate a signal cell in the region.

* * * * *